US009702320B2

(12) United States Patent
Mihara et al.

(10) Patent No.: US 9,702,320 B2
(45) Date of Patent: Jul. 11, 2017

(54) MULTI-PULSE ROCKET MOTOR AND PULSE UNIT THEREOF

(75) Inventors: Chiyako Mihara, Tokyo (JP); Tasuku Suzuki, Tokyo (JP); Katsunori Ieki, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 840 days.

(21) Appl. No.: 13/491,725

(22) Filed: Jun. 8, 2012

(65) Prior Publication Data

US 2012/0311993 A1   Dec. 13, 2012

(30) Foreign Application Priority Data

Jun. 8, 2011  (JP) .................................. 2011-128031

(51) Int. Cl.
  *F02K 9/10* (2006.01)
  *F02K 9/28* (2006.01)
  *F02K 9/34* (2006.01)

(52) U.S. Cl.
  CPC .................. *F02K 9/10* (2013.01); *F02K 9/34* (2013.01); *F02K 9/28* (2013.01)

(58) Field of Classification Search
  CPC .................. F02K 9/10; F02K 9/34; F02K 9/28
  USPC .......... 60/257, 244, 245, 250, 253, 256, 263
  See application file for complete search history.

(56) References Cited

U.S. PATENT DOCUMENTS

| 2,956,401 A | * | 10/1960 | Kane .......................... F02K 9/26 60/250 |
| 3,293,855 A | * | 12/1966 | Cuttill et al. .................. 60/229 |
| 3,354,647 A | * | 11/1967 | Aycock ..................... F02K 9/94 60/220 |
| 3,427,805 A | * | 2/1969 | Osburn ..................... F02K 9/10 102/289 |

(Continued)

FOREIGN PATENT DOCUMENTS

| EP | 2 503 135 | 9/2012 |
| JP | 63-168248 | 11/1988 |

(Continued)

OTHER PUBLICATIONS

Japanese Decision to Grant a Patent issued Jul. 22, 2014 in corresponding Japanese Patent Application No. 2011-128031 with partial English translation.

(Continued)

*Primary Examiner* — Pascal M Bui Pho
*Assistant Examiner* — Eric Linderman
(74) *Attorney, Agent, or Firm* — Wenderoth, Lind & Ponack, L.L.P.

(57) ABSTRACT

A pulse unit of a multi-pulse rocket motor has: a propellant in an internal-burning type shape or an internal-end-burning type shape that is loaded within a motor case; an igniter arranged at an end surface of the propellant; a barrier membrane arranged to cover a whole of an initial burning surface of the propellant and the igniter; a forward joint arranged at a forward end of the motor case; and a rearward joint arranged at a rearward end of the motor case. The (Continued)

forward joint is formed so as to be connectable with the rearward joint of another pulse unit. The rearward joint is formed so as to be connectable with the forward joint of yet another pulse unit.

7 Claims, 12 Drawing Sheets

(56) References Cited

U.S. PATENT DOCUMENTS

| | | | | |
|---|---|---|---|---|
| 3,568,448 | A * | 3/1971 | Webb, Jr. | F02K 9/95 137/68.11 |
| 4,594,945 | A * | 6/1986 | Alexandris | C06B 45/12 102/287 |
| 4,723,736 | A * | 2/1988 | Rider | B64G 1/002 102/377 |
| 4,766,726 | A * | 8/1988 | Tackett | F02K 9/38 102/374 |
| 4,829,765 | A * | 5/1989 | Bolieau | F02K 9/26 60/250 |
| 4,866,930 | A * | 9/1989 | Fling | F02K 9/38 60/250 |
| 4,956,971 | A * | 9/1990 | Smith | F02K 9/28 60/245 |
| 4,999,997 | A * | 3/1991 | Grosgebauer | F02K 9/28 102/290 |
| 5,070,691 | A * | 12/1991 | Smith | F02K 9/28 60/245 |
| 5,160,070 | A * | 11/1992 | Hibler | F02K 9/28 60/250 |
| 5,206,989 | A * | 5/1993 | Smith | F02K 9/28 29/447 |
| 5,419,118 | A * | 5/1995 | McSpadden et al. | 60/250 |
| 5,600,946 | A * | 2/1997 | Dombrowski | F02K 9/28 60/253 |
| 5,613,358 | A * | 3/1997 | Humiston et al. | 60/250 |
| 7,254,936 | B1 * | 8/2007 | Knight | F02K 9/10 102/287 |
| 7,281,367 | B2 * | 10/2007 | Rohrbaugh | F02K 9/08 60/204 |
| 8,156,867 | B2 * | 4/2012 | Stimpson | F42B 33/001 102/377 |
| 9,371,801 | B2 * | 6/2016 | Kishida | F02K 9/95 |
| 2005/0120703 | A1 * | 6/2005 | Rohrbaugh | F02K 9/08 60/229 |
| 2009/0139205 | A1 * | 6/2009 | Scott et al. | 60/253 |
| 2010/0218481 | A1 * | 9/2010 | Mihara | F02K 9/12 60/247 |
| 2013/0014491 | A1 * | 1/2013 | Suzuki | F02K 9/28 60/250 |
| 2013/0111874 | A1 * | 5/2013 | Kawadu | F02K 9/08 60/256 |
| 2013/0327016 | A1 * | 12/2013 | Kishida | F02K 9/95 60/250 |

FOREIGN PATENT DOCUMENTS

| | | |
|---|---|---|
| JP | 2-78759 | 3/1990 |
| JP | 2-211361 | 8/1990 |
| JP | 3231778 | 11/2001 |
| JP | 2005-171970 | 6/2005 |
| JP | 2008-280967 | 11/2008 |
| JP | 4719182 | 7/2011 |

OTHER PUBLICATIONS

Japanese Office Action issued Jul. 22, 2013 in corresponding Japanese Patent Application No. 2011-128031 with partial English translation.

* cited by examiner

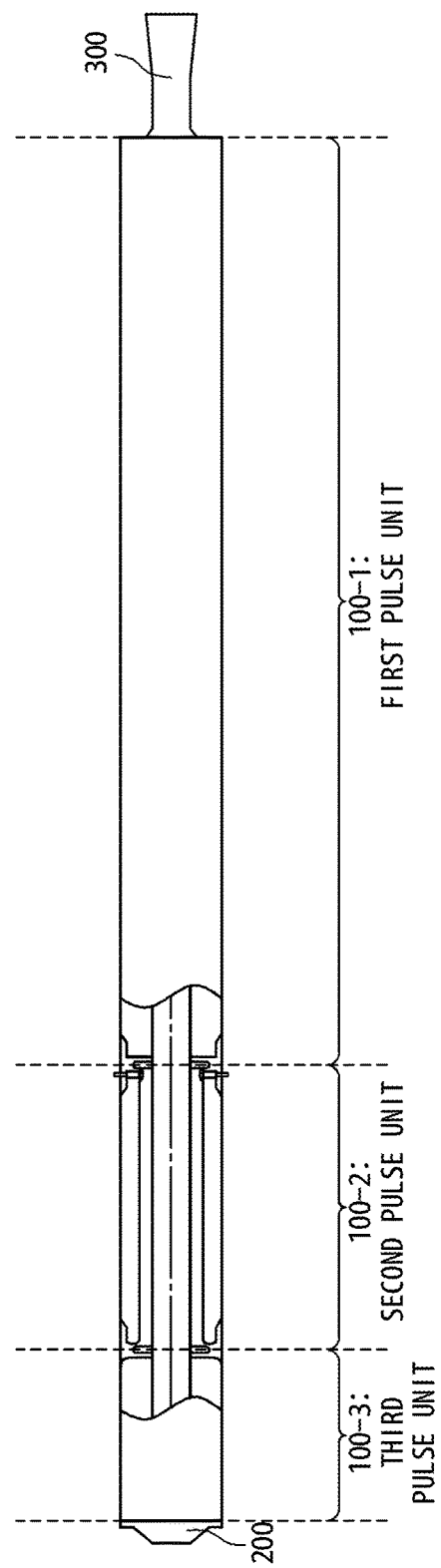

MULTI-PULSE ROCKET MOTOR AND PULSE UNIT THEREOF

INCORPORATION BY REFERENCE

This application is based upon and claims the benefit of priority from Japanese patent application No. 2011-128031, filed on Jun. 8, 2011, the disclosure of which is incorporated herein in its entirety by reference.

BACKGROUND OF THE INVENTION

1. Field of the Invention

The present invention relates to a multi-pulse rocket motor.

2. Description of Related Art

In operating a missile equipped with a two-pulse rocket motor (a solid propellant rocket motor which generates two-step thrust at expected time), the missile is flown toward its target by being accelerated by a first pulse (combustion of a first propellant) and then the missile is reaccelerated by a second pulse (combustion of a second propellant) when coming close to the target, to enhance maneuverability at the terminal guidance. Therefore, when aiming at a remote target, it is necessary to increase the amount of the first propellant consumed in the first pulse in order to increase either burn time or thrust, or both the burn time and thrust.

However, in a case of a two-pulse rocket motor disclosed in Patent Document 1 (Japanese Patent No. 3231778) and Patent Document 2 (Japanese Patent Publication JP-2005-171970), the first propellant and the second propellant are arranged in a axial direction of the rocket motor and also there is a limit to a length of the rocket motor in terms of equipment or storage. Therefore, the first propellant cannot have enough length. In this case, it is highly possible that an initial burning area becomes small and thus necessary initial thrust cannot be obtained.

Moreover, as for a barrier membrane and a barrier membrane holder of the two-pulse rocket motor disclosed in Patent Document 1 and Patent Document 2, breakability and durability of the barrier membrane at the time when a second igniter operates are unclear. When a barrier membrane is broken at an unintended position, combustion of the second propellant or a combustion gas flow is disturbed. In some cases, a nozzle may be blocked up with the broken barrier membrane.

In a case where the first igniter and the second igniter are arranged in series in the axial direction of the rocket motor disclosed in Patent Document 2, the igniters have cantilever long and thin structure. Therefore, the structure needs to be strengthened in order to secure the strength of the igniters against such environment as vibration at the time of operation. This causes increase in structural weight, which is unsuitable for a long rocket motor.

The inventors of the present application have proposed, in Patent Document 3 (Japanese Patent No. 4719182), a two-pulse rocket motor which can solve the problems of the techniques disclosed in Patent Document 1 and Patent Document 2. The two-pulse rocket motor disclosed in Patent Document 3 will be described below.

FIG. 1 is a longitudinal sectional view showing an example of the two-pulse rocket motor disclosed in Patent Document 3. FIG. 2 is a sectional view taken along a line A-A in FIG. 1.

The two-pulse rocket motor generates two-step thrust by first combusting a first propellant 4 and then, after a certain period of time has passed, combusting a second propellant 5. Therefore, the second propellant 5, until starting to be burned, needs to withstand high-temperature combustion gas and high pressure generated as a result of the combustion of the first propellant 4.

As shown in FIGS. 1 and 2, a nozzle 2 having an exhaust hole 12 at the center for exhausting the combustion gas is fixed to a rear portion of a cylindrical motor case 1. A motor head 3 is fixed to a front portion of the motor case 1, and a first igniter 6 for combusting the first propellant 4 is fixed to the motor head 3.

The first propellant 4 and the second propellant 5 both in a hollow tubular shape (i.e. an internal-burning type propellant shape or an internal-end-burning type propellant shape) are loaded within the motor case 1. The second propellant 5 is arranged on an outer periphery of a front portion of the first propellant 4. It should be noted that the shape of the first propellant 4 and the second propellant 5 each may be a hollow cylinder, a hollow tube with a polygonal outer surface and/or a polygonal inner surface, or a hollow cone.

The first propellant 4 and the second propellant 5 are separated from each other by a barrier membrane 10. A highly heat-resistant rubber such as EPDM rubber, silicone rubber, silicone rubber or EPDM rubber containing such inorganic fiber as Kevlar fiber, can be used as the barrier membrane 10.

A second igniter 8 for combusting the second propellant 5 is provided at a forward end of the second propellant 5.

An operation of the two-pulse rocket motor shown in FIGS. 1 and 2 is as follows. The first igniter 6 starts operating in response to an external signal and hence the first propellant 4 starts burning (combusting). At this point of time, the barrier membrane 10 is not exposed to high-temperature combustion gas. After that, when the first propellant 4 has been combusted to the position of the barrier membrane 10, the barrier membrane 10 is exposed to high-temperature combustion gas. After a certain period of time has passed from completion of the combustion of the first propellant 4, the second igniter 8 starts operating in response to an external signal and hence the second propellant 5 starts burning (combusting).

According to the two-pulse rocket motor shown in FIGS. 1 and 2 as described above, an inner surface of the first propellant 4 is exposed to a burning region 11 over almost the full length of the motor case 1 in the axial direction, and thereby an initial burning area can be secured. Therefore, there is no need to provide the inner surface of the first propellant 4 with a large slit.

Moreover, since the second propellant 5 is arranged on the outer periphery of the first propellant 4, a burning area of the second propellant 5 does not become extremely smaller than a burning area of the first propellant 4. Therefore, the nozzle 2 can be shared by the first propellant 4 and the second propellant 5.

In addition, since the second propellant 5 is arranged on the outer periphery of the first propellant 4 and the barrier membrane 10 is provided between the first propellant 4 and the second propellant 5, a time during which the barrier membrane 10 is exposed to the high-temperature combustion gas can be shortened as much as possible. In other words, heat protection of the barrier membrane 10 is achieved.

Furthermore, heat protection of the second igniter 8 is achieved by the barrier membrane 10 as in the case of the second propellant 5. The second igniter 8 is burned down due to its operation as expected.

It should be noted that an initial burning surface of the second propellant 5 means a surface which burns from an initial stage when the second propellant 5 starts burning, namely, a surface which is first exposed to the burning region 11 when the second propellant 5 starts burning. In the case of the example shown in FIG. 1, the initial burning surface of the second propellant 5 includes a cylindrical inner surface and a ring-shaped rear surface of the second propellant 5.

FIG. 3 is a longitudinal sectional view showing another example of the two-pulse rocket motor disclosed in Patent Document 3. FIG. 4 is a sectional view taken along a line B-B in FIG. 3.

In the example shown in FIGS. 3 and 4, the barrier membrane 10 is divided into two parts to provide a weak section (joint section). More specifically, the barrier membrane 10 covering the second propellant 5 comprises: an aft barrier membrane 10a in a circular truncated cone shape arranged on a rear surface of the second propellant 5; and an inner barrier membrane 10b in a tubular shape arranged on the inner surface of the second propellant 5. Respective ends of the aft barrier membrane 10a and the inner barrier membrane 10b are bonded with each other by a fire-resistant adhesive over an entire periphery, to serve as the weak section. The weak section (joint section) is not broken during the combustion of the first propellant 4 but is certainly broken by pressure of gas generated by the operation of the second igniter 8 or the combustion of the second propellant 5.

FIG. 5 is a longitudinal sectional view showing a deformation state of the barrier membrane 10 at the time of the combustion of the second propellant 5. FIG. 6A is a sectional view taken along a line C-C in FIG. 5. FIG. 6B is a sectional view taken along a line D-D in FIG. 5.

At the time of combustion of the second propellant 5, the inner barrier membrane 10b, which is a large part of the barrier membrane 10, is deformed toward the center of the motor case 1 and is held at the forward portion of the motor case 1 where a combustion gas flow of the second propellant 5 is relatively slow. Meanwhile, a break portion of the aft barrier membrane 10a is deformed to be turned up backward along the combustion gas flow. Therefore, such an effect as breakability and durability of the barrier membrane 10 (the aft barrier membrane 10a and the inner barrier membrane 10b) become clear and certain and can be obtained in addition to the above-mentioned effects.

It should be noted that the same effects as in the case of the above-mentioned divided structure can be obtained even when the barrier membrane 10 is formed integrally and a cutoff line or a notch is provided at a position to be broken.

The second igniter 8 may be arranged at a rearward end surface of the second propellant 5 that is closer to the weak section (joint section) of the barrier membrane 10 (the aft barrier membrane 10a and the inner barrier membrane 10b). In this case, certainty of breakage of the barrier membrane 10 (the aft barrier membrane 10a and the inner barrier membrane 10b) becomes higher.

In the case of the two-pulse rocket motor as described above, the second igniter 8 and the first igniter 6 are independent of each other across the barrier membrane 10, in terms of structure. Therefore, it is possible to secure the strength of the igniters against such environment as vibration at the time of operation, without strengthening the structure of the igniters to increase structural weight even in a case of a long motor.

[Patent Document 1] Japanese Patent No. 3231778
[Patent Document 2] Japanese Patent Publication JP-2005-171970
[Patent Document 3] Japanese Patent No. 4719182

SUMMARY

An object of the present invention is to provide a technique that can improve design flexibility and manufacturability of a multi-pulse rocket motor.

In an aspect of the present invention, a pulse unit of a multi-pulse rocket motor is provided. The pulse unit has: a propellant in an internal-burning type or internal-end-burning type shape that is loaded within a motor case; an igniter arranged at an end surface of the propellant; a barrier membrane arranged to cover a whole of an initial burning surface of the propellant and the igniter; a forward joint arranged at a forward end of the motor case; and a rearward joint arranged at a rearward end of the motor case. The forward joint is formed so as to be connectable with the rearward joint of another pulse unit. The rearward joint is formed so as to be connectable with the forward joint of still another pulse unit.

The barrier membrane may have: an inner barrier membrane that covers an inner surface of the propellant; and an aft barrier membrane that covers a rear surface of the propellant. Respective ends of the aft barrier membrane and the inner barrier membrane are bonded with each other over an entire periphery.

The pulse unit may further have another propellant that is loaded so as to cover the barrier membrane. This propellant is in an internal-burning type or internal-end-burning type shape.

A first barrier membrane holder and a second barrier membrane holder may be respectively provided on the forward joint side and the rearward joint side of the barrier membrane. The barrier membrane is mechanically fixed to the motor case by the first barrier membrane holder and the second barrier membrane holder.

In another aspect of the present invention, a multi-pulse rocket motor is provided. The multi-pulse rocket motor has a plurality of the above-mentioned pulse units. The plurality of pulse units are connected in series by the forward joint and the rearward joint.

In still another aspect of the present invention, a multi-pulse rocket motor is provided. The multi-pulse rocket motor has: a first pulse unit; and a second pulse unit. Each of the first pulse unit and the second pulse unit has: a motor case; a forward joint arranged at a forward end of the motor case; and a rearward joint arranged at a rearward end of the motor case. The forward joint of the first pulse unit is connected with the rearward joint of the second pulse unit. The first pulse unit further has a first propellant in an internal-burning type or internal-end-burning type shape that is loaded within the motor case. The second pulse unit further has: a second propellant in an internal-burning type or internal-end-burning type shape that is loaded within the motor case; an igniter arranged at an end surface of the second propellant; and a barrier membrane arranged to cover a whole of an initial burning surface of the second propellant and the igniter.

The first propellant may be extended into the second pulse unit. In this case, the first propellant is loaded so as to cover the barrier membrane in the second pulse unit.

The barrier membrane may have: an inner barrier membrane that covers an inner surface of the propellant; and an aft barrier membrane that covers a rear surface of the propellant. Respective ends of the aft barrier membrane and the inner barrier membrane are bonded with each other over an entire periphery.

A first barrier membrane holder and a second barrier membrane holder are respectively provided on the forward joint side and the rearward joint side of the barrier membrane. The barrier membrane is mechanically fixed to the motor case by the first barrier membrane holder and the second barrier membrane holder. The first barrier membrane holder of a pulse unit connected to a head unit is mechanically fixed to a front motor head or a first igniter.

According to the present invention, it is possible to improve design flexibility and manufacturability of a multi-pulse rocket motor.

BRIEF DESCRIPTION OF THE DRAWINGS

FIG. 7 is a conceptual diagram showing a multi-pulse rocket motor according to an embodiment of the present invention;

DESCRIPTION OF PREFERRED EMBODIMENTS

Figure 1:
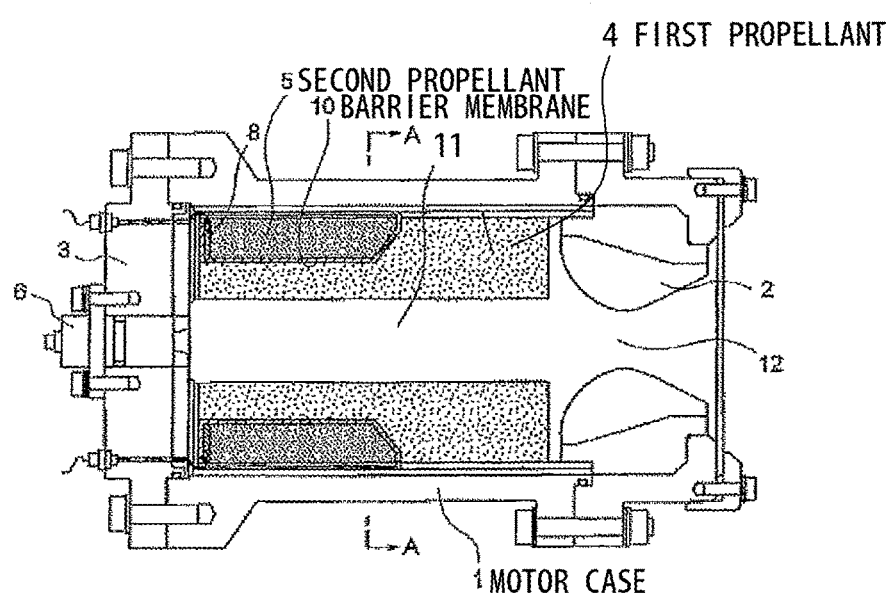
FIG. 1 is a longitudinal sectional view showing an example of a two-pulse rocket motor disclosed in Japanese Patent No. 4719182.
Figure 2:
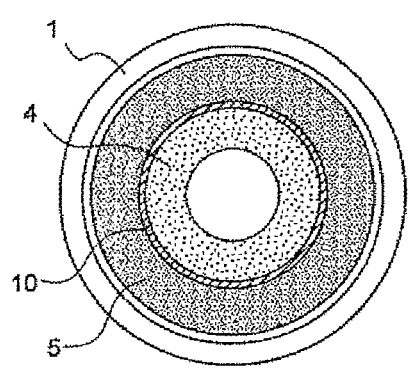
FIG. 2 is a sectional view taken along a line A-A in FIG. 1.
Figure 3:
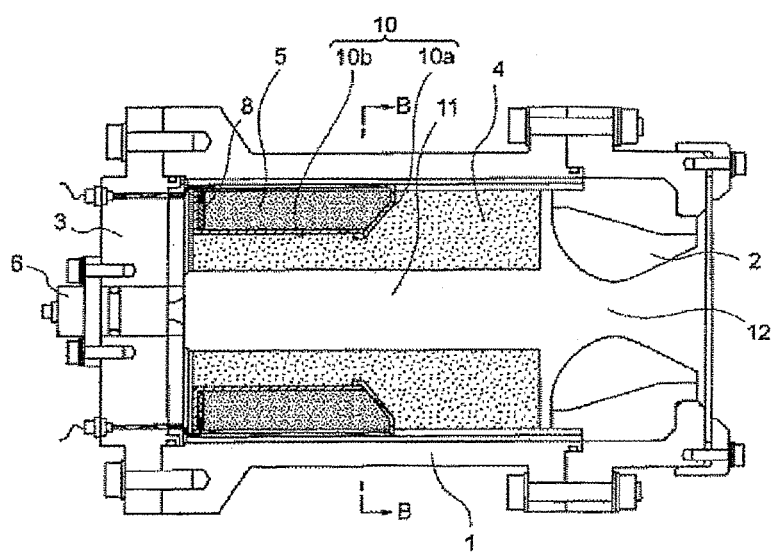
FIG. 3 is a longitudinal sectional view showing another example of a two-pulse rocket motor disclosed in Japanese Patent No. 4719182.
Figure 4:
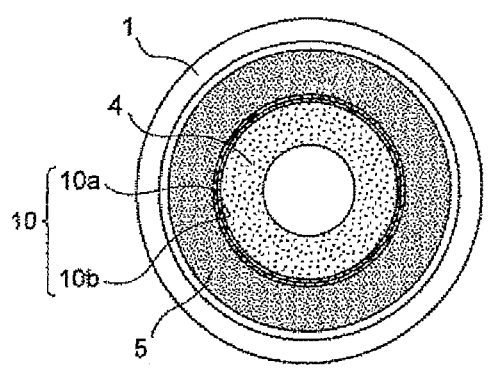
FIG. 4 is a sectional view taken along a line B-B in FIG. 3.
Figure 5:
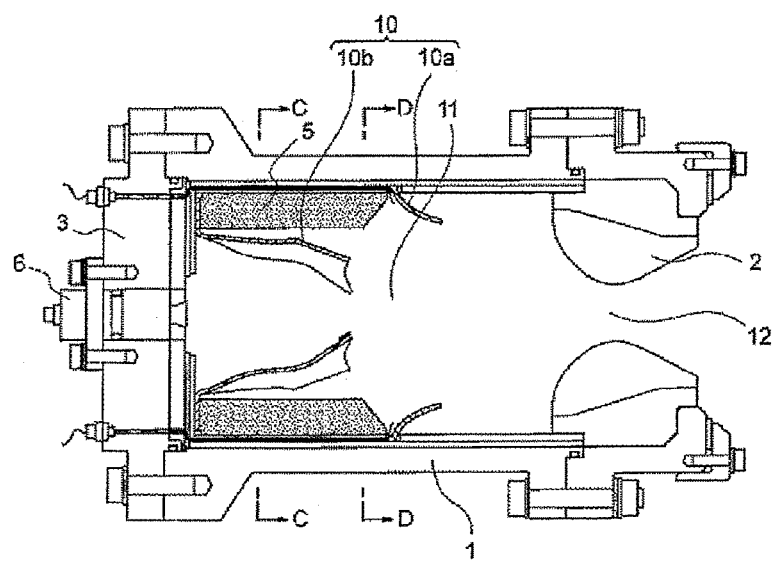
FIG. 5 is a longitudinal sectional view showing a deformation state of a barrier membrane at the time when a second propellant combustions in a configuration shown in FIG. 3.
Figure 6A:
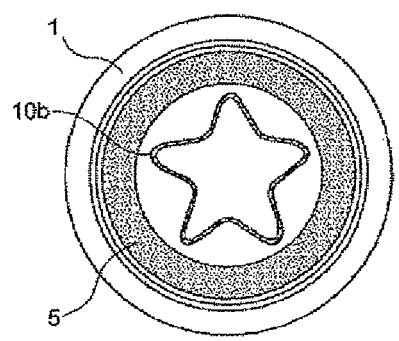
FIG. 6A is a sectional view taken along a line C-C in FIG. 5.
Figure 6B:
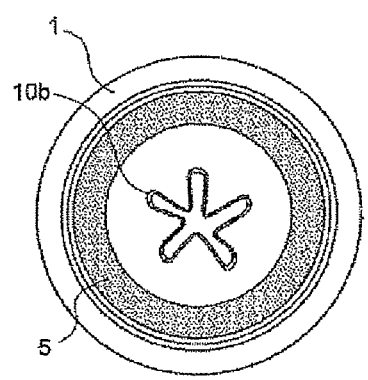
FIG. 6B is a sectional view taken along a line D-D in FIG. 5.

Embodiments of the present invention will be described with reference to the attached drawings.

As described above, the inventors of the present application have proposed the useful two-pulse rocket motor, in Patent Document 3 (Japanese Patent No. 4719182) (See FIG. 1 to FIG. 6B). The contents disclosed in Patent Document 3 are incorporated in this specification by reference. In the following description, the same names are given to the same components as those described in Patent Document 3, and an overlapping description will be omitted as appropriate.

A basic concept of the present invention is to "unitize" a section which corresponds to each pulse in a rocket motor as described in Patent Document 3 for example. A unitized section which corresponds to each pulse is hereinafter referred to as a "pulse unit". By connecting (interlocking) a plurality of pulse units in series, it is possible to achieve not only a two-pulse rocket motor as described in Patent Document 3 but also a rocket motor with three or more pulses. A rocket motor with two or more pulses is hereinafter referred to as a "multi-pulse rocket motor". According to the present invention, the concept of the "pulse unit" is introduced, which makes it possible to improve design flexibility and manufacturability of a multi-pulse rocket motor. Embodiments of the present invention will be described in detail below.

FIG. 7 is a conceptual diagram showing a multi-pulse rocket motor according to the present embodiment. The multi-pulse rocket motor according to the present embodiment has a plurality of pulse units 100, a head unit 200 and a nozzle unit 300. The plurality of pulse units 100 are interlocked (connected) in series. Furthermore, the plurality of pulse units 100 connected in series are sandwiched between the head unit 200 and the nozzle unit 300. In the example shown in FIG. 7, the nozzle unit 300, a first pulse unit 100-1, a second pulse unit 100-2, a third pulse unit 100-3 and the head unit 200 are connected in series in this order from the rear (on the side of the nozzle unit 300) toward the front (on the side of the head unit 200).

Figure 8:
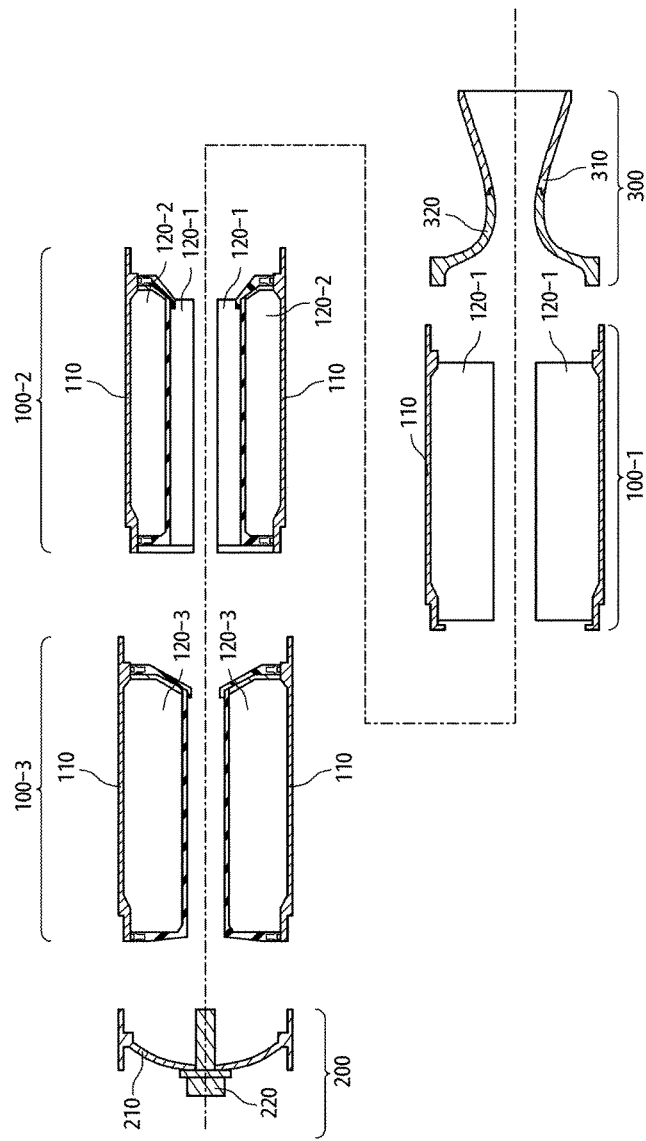
FIG. 8 is a longitudinal sectional view showing unit division of the multi-pulse rocket motor according to the embodiment of the present invention.

FIG. 8 is a longitudinal sectional view showing unit division of the multi-pulse rocket motor shown in FIG. 7.

The first pulse unit 100-1 is a pulse unit corresponding to the first-stage pulse. The first pulse unit 100-1 has a cylindrical motor case 110 and a first propellant 120-1. The first propellant 120-1 is loaded within the motor case 110. The first propellant 120-1 has an internal-burning type shape or an internal-end-burning type shape and a hollow tubular shape.

The second pulse unit 100-2 is a pulse unit corresponding to the second-stage pulse. The second pulse unit 100-2 has a cylindrical motor case 110 and a second propellant 120-2. The second propellant 120-2 is loaded within the motor case 110. The second propellant 120-2 has an internal-burning type shape or an internal-end-burning type shape and a hollow tubular shape.

The third pulse unit 100-3 is a pulse unit corresponding to the third-stage pulse. The third pulse unit 100-3 has a cylindrical motor case 110 and a third propellant 120-3. The third propellant 120-3 is loaded within the motor case 110. The third propellant 120-3 has an internal-burning type shape or an internal-end-burning type shape and a hollow tubular shape.

The head unit 200 has a front motor head 210 and a first igniter 220. The first igniter 220, which is for igniting the first propellant 120-1, is fixed to the front motor head 210 of the head unit 200.

The nozzle unit 300 has a nozzle 310 having an exhaust hole for exhausting combustion gas and a rear of the end plate 320.

Figure 9:
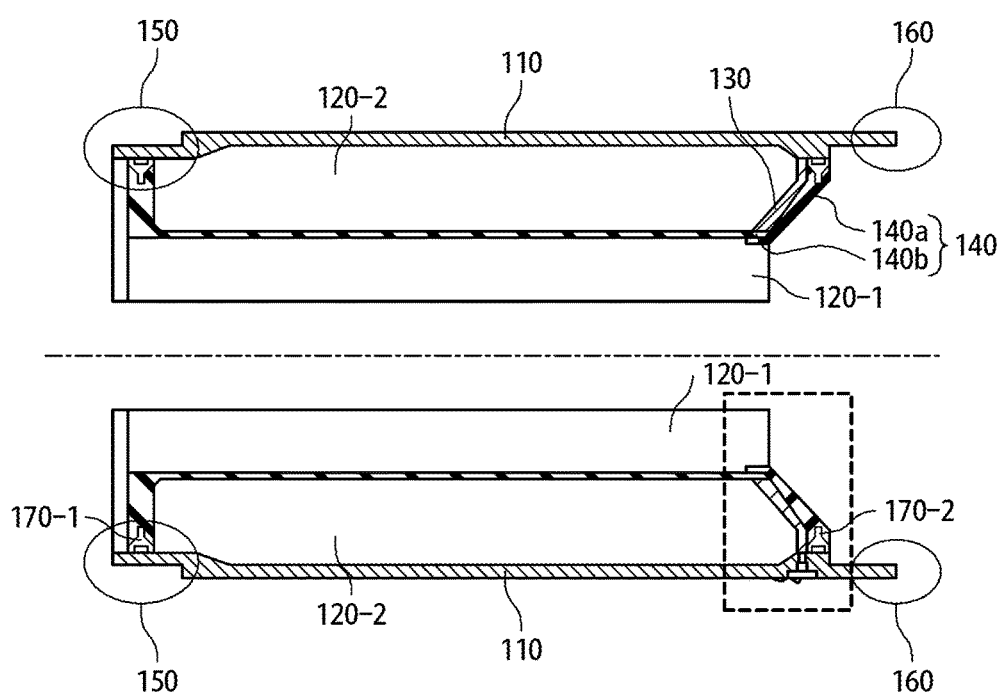
FIG. 9 is a longitudinal sectional view showing a configuration example of a single pulse unit as a component of the multi-pulse rocket motor according to the embodiment of the present invention.
Figure 10:
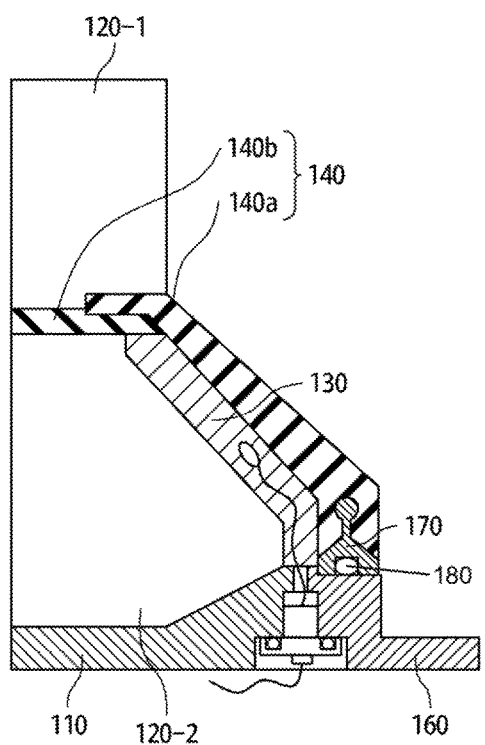
FIG. 10 is an enlarged view of a portion surrounded by a dashed line in FIG. 9.

FIG. 9 shows a configuration example of a single pulse unit 100 according to the present embodiment. FIG. 10 is an enlarged view of a portion surrounded by a dashed line in FIG. 9. Here, a configuration example of the second pulse unit 100-2 will be described as an example.

As shown in FIG. 9, the second pulse unit 100-2 has the cylindrical motor case 110, the second propellant 120-2, an igniter 130, a barrier membrane 140, a forward joint 150 and a rearward joint 160.

The second propellant 120-2 is loaded within the motor case 110. The shape of the second propellant 120-2 is an internal-burning type or an internal-end-burning type.

The igniter 130, which is for igniting the second propellant 120-2, is arranged at an end surface of the second propellant 120-2. In the example shown in FIG. 9, the igniter 130 is arranged on a rear end surface of the second propellant 120-2. Alternatively, the igniter 130 may be arranged on a front end surface of the second propellant 120-2. In either case, late-installation of the igniter 130 is possible.

The barrier membrane 140 is arranged so as to cover a whole of an initial burning surface of the second propellant 120-2 and the igniter 130. The barrier membrane 140 makes it possible to protect the second propellant 120-2 and the igniter 130 from heat during the combustion of the first-stage pulse.

Furthermore, it is preferable that the barrier membrane 140 is divided into an aft barrier membrane 140a and an inner barrier membrane 140b as in the case of the Patent Document 3. In this case, the aft barrier membrane 140a in a circular truncated cone shape is provided so as to cover the rear surface of the second propellant 120-2. On the other hand, the inner barrier membrane 140b in a tubular shape is provided so as to cover the inner surface of the second propellant 120-2. Respective ends of the aft barrier membrane 140a and the inner barrier membrane 140b are bonded with each other by a fire-resistant adhesive over an entire periphery, to serve as a weak section. The weak section (joint section) is not broken during the combustion of the first propellant 120-1 but is certainly broken due to operation of the igniter 130 or pressure of gas generated by the combustion of the second propellant 120-2.

At the time of combustion of the second propellant 120-2, the inner barrier membrane 140b, which is a large part of the barrier membrane 140, is deformed toward the center of the motor case 110 and is held at the forward portion of the motor case 110 where a combustion gas flow of the second propellant 120-2 is relatively slow. Meanwhile, a break portion of the aft barrier membrane 140a is deformed to be turned up backward along the combustion gas flow. Therefore, breakability and durability of the barrier membrane 140 (the aft barrier membrane 140a and the inner barrier membrane 140b) become clear and certain (see FIG. 5, FIG. 6A, and FIG. 6B). Moreover, when the igniter 130 is arranged adjacent to the aft barrier membrane 140a as in the example shown in FIGS. 9 and 10, certainty of breakage of the barrier membrane 140 (the aft barrier membrane 140a and the inner barrier membrane 140b) becomes higher, which is preferable. It should be noted that the same effects as in the case of the above-mentioned divided structure can be obtained even when the barrier membrane 140 is formed integrally and a cutoff line or a notch is provided at a position to be broken.

The forward joint 150 is arranged at a forward end of the motor case 110. On the other hand, the rearward joint 160 is arranged at a rearward end of the motor case 110. The forward joint 150 is formed so as to be connectable with the rearward joint 160 of another pulse unit 100. On the other hand, the rearward joint 160 is formed so as to be connectable with the forward joint 150 of another pulse unit 100. By using the forward joint 150 and the rearward joint 160, it is possible to interlock (connect) the pulse units 100 one after another.

Moreover, as shown in FIGS. 9 and 10, the second pulse unit 100-2 may be further provided with barrier membrane holders 170 (a first barrier membrane holder 170-1 and a second barrier membrane holder 170-2). Each of the barrier membrane holders 170 is a ring-shaped metallic part having an O-ring groove on its outer periphery. As shown in FIG. 9, the first barrier membrane holder 170-1 and the second barrier membrane holder 170-2 are respectively fixed to the forward joint 150 side and the rearward joint 160 side of the barrier membrane 140. With the barrier membrane holders 170 having the O-rings 180 on their respective outer peripheries, the barrier membrane 140 is mechanically fixed to the motor case 110. As a result, entry of the combustion gas from the burning region into a region separated by the barrier membrane 140 (i.e., a region where the second propellant 120-2 and the igniter 130 are provided) is blocked by the O-rings 180 at the time of the combustion of the first propellant 120-1.

As shown in FIG. 9, the first propellant 120-1 for the first-stage pulse may be further loaded within the second pulse unit 100-2. In this case, in the second pulse unit 100-2, the first propellant 120-1 is loaded so as to cover the above-mentioned barrier membrane 140. An inner surface of the first propellant 120-1 is exposed to the burning region. To load the first propellant 120-1 also in the second pulse unit 100-2 in this manner makes it possible to secure a sufficient initial burning area with respect to the first propellant 120-1 (first-stage pulse), as in the case of the Patent Document 3.

It should be noted that the barrier membrane 140 and the igniter 130 are not provided in the first-stage first pulse unit 100-1. As shown in FIG. 8, in the first pulse unit 100-1, the first propellant 120-1 is loaded within the motor case 110 and the inner surface of the first propellant 120-1 is exposed to the burning region. The first igniter 220 for igniting the first propellant 120-1 may be provided at the head unit 200 or may be provided at the rear motor head 320 of the nozzle unit 300.

As in the case of the second pulse unit 100-2, each of the other pulse units 100 has the forward joint 150 and the rearward joint 160. By using the forward joints 150 and the rearward joints 160, it is possible to interlock (connect) the plurality of pulse units 100 in series.

Figure 11:
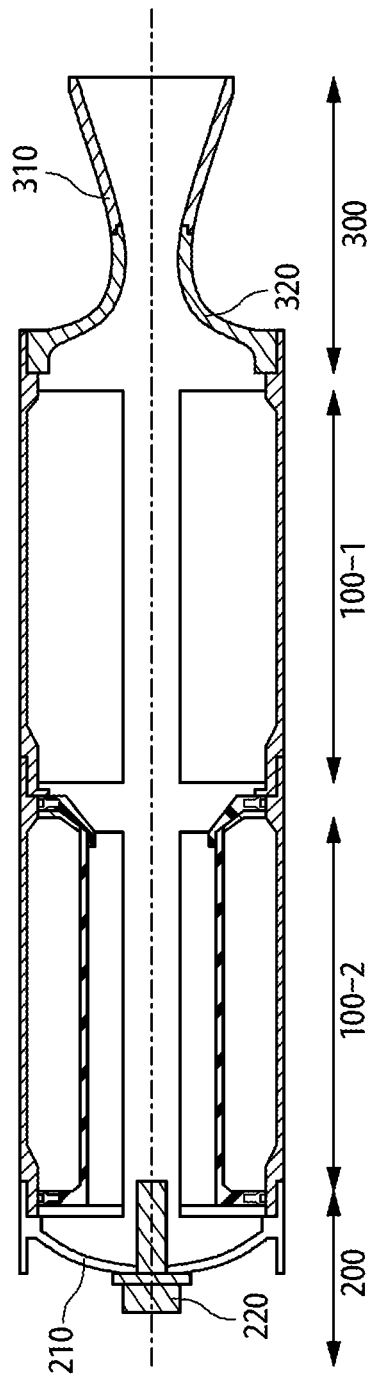
FIG. 11 is a longitudinal sectional view showing a configuration example of a two-pulse rocket motor using the pulse units according to the embodiment of the present invention.

FIG. 11 shows a configuration example of a two-pulse rocket motor utilizing the pulse units 100 according to the present embodiment. The forward joint 150 of the first pulse unit 100-1 is connected with the rearward joint 160 of the second pulse unit 100-2. The rearward joint 160 of the first pulse unit 100-1 is connected with the nozzle unit 300. The forward joint 150 of the second pulse unit 100-2 is connected with the head unit 200. In this manner, a two-pulse rocket motor as described in Patent Document 3 can be easily achieved by using the pulse units 100 according to the present embodiment.

Figure 12:
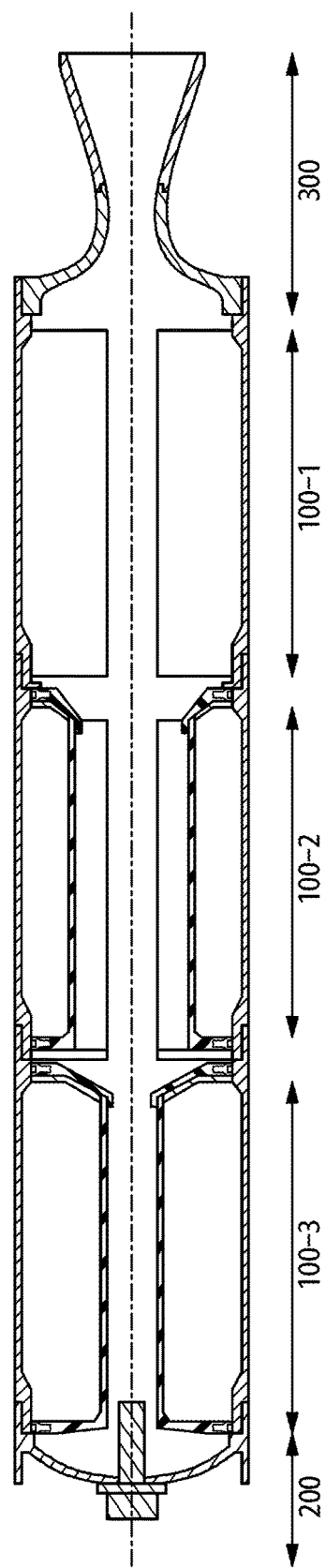
FIG. 12 is a longitudinal sectional view showing a configuration example of a triple-pulse rocket motor using the pulse units according to the embodiment of the present invention.

FIG. 12 shows a configuration example of a three-pulse rocket motor utilizing the pulse units 100 according to the present embodiment. In this case, the forward joint 150 of the second pulse unit 100-2 is connected with the rearward joint 160 of the third pulse unit 100-3. The forward joint 150 of the third pulse unit 100-3 is connected with the head unit 200. The third pulse unit 100-3 has a barrier membrane 140 which covers the entire initial burning surface of the third propellant 120-3 and the igniter 130, as in the case of the second pulse unit 100-2. A size of a region covered by the barrier membrane 140 can be different with respect to each pulse unit 100, and is freely designed depending on intended use.

It should be noted that the first barrier membrane holder 170-1 of the pulse unit 100 connected to the head unit 200 may be mechanically fixed to the front motor head 210 or the first igniter 220.

According to the present embodiment as described above, a section which corresponds to each pulse of the multi-pulse rocket motor is provided as the pulse unit 100. It is possible to achieve a desired rocket motor performance by connecting a desired number of the pulse units 100. That is to say, design flexibility of the multi-pulse rocket motor is improved according to the present embodiment.

Also, according to the present embodiment, each pulse unit 100 is short in length, which is advantageous in portability at the time of manufacturing. Moreover, it is possible to reduce a manufacturing period by manufacturing a plurality of pulse units 100 in parallel.

Furthermore, according to the present embodiment, late-installation of the igniter 130 and the barrier membrane 140 is possible, which makes it possible to directly load the propellant 120 into each pulse unit 100. As a result, a high filling rate of the propellant 120 can be achieved. As a comparative example, let us consider the two-pulse rocket motor shown in FIGS. 1 and 3. In the case of the comparative example, no pulse unit is utilized and thus it is necessary to form at least one of the first propellant 4 and the second propellant 5 outside and insert the formed propellant into the motor case. In this case, however, a gap is inevitably caused between the formed propellant and the motor case, because an inner diameter of the inner shape of the motor case is usually smaller at the both ends than at the center portion. This means deterioration of a filling rate of the propellant. According to the present embodiment, the pulse unit 100 corresponding to each pulse is independently formed, which makes it possible to directly load the propellant 120 into each pulse unit 100. As a result, a high filling rate of the propellant 120 can be achieved.

The present embodiment of the present invention has been described above by referring to the attached drawings. However, the present invention is not limited to the embodiment, and can be properly changed by those skilled in the art without departing from the scope of the invention.

What is claimed is:

1. A pulse unit of a multi-pulse rocket motor, said pulse unit comprising:
    a motor case having a forward joint arranged at a forward end of said pulse unit and a rearward joint arranged at a rearward end of said pulse unit;
    a propellant being filled from said forward joint to said rearward joint along an inner circumferential surface of said motor case so as to have an inner circumferential surface of a hollow cylindrical shape;
    an igniter disposed to ignite said propellant;
    a barrier membrane having a first barrier membrane and a second barrier membrane to cover a whole of an initial burning surface of said propellant and said igniter wherein said barrier membrane is in contact with the inner circumferential surface of said propellant; and
    a first barrier membrane holder and a second barrier membrane holder respectively coupled to said forward joint and said rearward joint through O-rings to hold said first barrier membrane and said second barrier membrane such that said first barrier membrane and said second barrier membrane seal said propellant from a combustion gas of another propellant other than said propellant and such that said barrier membrane is mechanically fixed to said motor case by said first barrier membrane holder and said second barrier membrane holder,
    wherein said forward joint is disposed so as to be connectable with a rearward joint of a next-stage pulse unit or a joint of a head unit,
    wherein said rearward joint is disposed so as to be connectable with a forward joint of a previous-stage pulse unit or a joint of a nozzle unit,
    wherein said first barrier membrane holder is integrated into said first barrier membrane and has a groove to accept a first of said O-rings, and
    wherein said second barrier membrane holder is integrated into said second barrier membrane and has a groove to accept a second of said O-rings.

2. The pulse unit according to claim 1, wherein:
    said first barrier membrane is an inner barrier membrane that is held by said first barrier membrane holder and covers a first one of a plurality of end surfaces of said propellant and the inner circumferential surface of said propellant;
    said second barrier membrane is an aft barrier membrane that is held by said second barrier membrane holder and covers a second one of the plurality of end surfaces of said propellant and a part of the inner circumferential surface of said propellant; and
    respective ends of said aft barrier membrane and said inner barrier membrane are bonded to each other over an entire periphery thereof.

3. The pulse unit according to claim 1, further comprising an additional propellant filled from said forward joint to said rearward joint to cover said barrier membrane.

4. A multi-pulse rocket motor comprising a plurality of pulse units connected in series,
    wherein each of said plurality of pulse units other than a first-stage pulse unit comprises:
    a motor case having a forward joint arranged at a forward end of said corresponding one of said plurality of pulse units other than said first-stage pulse unit and a rearward joint arranged at a rearward end of said corresponding one of said plurality of pulse units other than said first-stage pulse unit;
    a propellant being filled from said forward joint to said rearward joint along an inner circumferential surface of said motor case so as to have an inner circumferential surface of a hollow cylindrical shape;
    an igniter disposed to ignite said propellant;
    a barrier membrane having a first barrier membrane and a second barrier membrane to cover a whole of an initial burning surface of said propellant and said igniter wherein said barrier membrane is in contact with the inner circumferential surface of said propellant; and
    a first barrier membrane holder and a second barrier membrane holder respectively coupled to said forward joint and said rearward joint through O-rings to hold said first barrier membrane and said second barrier membrane such that said first barrier membrane and said second barrier membrane seal said propellant from a combustion gas of another propellant other than said propellant and such that said barrier membrane is mechanically fixed to said motor case by said first barrier membrane holder and said second barrier membrane holder;
    wherein said first barrier membrane holder is integrated into said first barrier membrane and has a groove to accept a first of said O-rings, wherein said second barrier membrane holder is integrated into said second barrier membrane and has a groove to accept a second of said O-rings, wherein said first-stage pulse unit comprises:
a motor case having a forward joint arranged at a forward end of said first-stage pulse unit and a rearward joint arranged at a rearward end of said first-stage pulse unit; a propellant being filled from said forward joint of said first-stage pulse unit to said rearward joint of said first-stage pulse unit along an inner circumferential surface of said motor case of said first-stage pulse unit so as to have an inner circumferential surface of a hollow cylindrical shape; and an igniter disposed to ignite said propellant of said first-stage pulse unit;

wherein said forward joint of each of all of said plurality of pulse units connected in series is disposed so as to be connectable with said rearward joint of a next-stage one of said plurality of pulse units connected in series or a joint of a head unit, and wherein said rearward joint of each of all of said plurality of pulse units connected in series is disposed so as to be connectable with said forward joint of a previous-stage one of said plurality of pulse units connected in series or a joint of a nozzle unit.

5. A multi-pulse rocket motor comprising:
a first pulse unit of a first-stage; and
a second pulse unit of a second-stage,
wherein each of said first pulse unit and said second pulse unit comprises:
a motor case having a forward joint arranged at a forward end of said corresponding pulse unit and a rearward joint arranged at a rearward end of said corresponding pulse unit;
a propellant being filled from said forward joint to said rearward joint along an inner circumferential surface of said motor case so as to have an inner circumferential surface of a hollow cylindrical shape; and
an igniter disposed to ignite said propellant,
wherein said forward joint of said first pulse unit is connected with said rearward joint of said second pulse unit,
wherein said rearward joint of said first pulse unit is disposed so as to be connectable with a joint of a nozzle unit, wherein said second pulse unit further comprises:
a barrier membrane having a first barrier membrane and a second barrier membrane to cover a whole of an initial burning surface of said propellant of said second pulse unit and said igniter of said second pulse unit, wherein said barrier membrane is in contact with the inner circumferential surface of said propellant of said second pulse unit; and
a first barrier membrane holder and a second barrier membrane holder respectively coupled to said forward joint of said second pulse unit and said rearward joint of said second pulse unit through O-rings to hold said first barrier membrane and said second barrier membrane such that said first barrier membrane and said second barrier membrane seal said propellant of said second pulse unit from a combustion gas of another propellant other than said propellant of said second pulse unit and such that said barrier membrane is mechanically fixed to said motor case by said first barrier membrane holder and said second barrier membrane holder,
wherein said first barrier membrane holder is integrated into said first barrier membrane and has a groove to accept a first of said O-rings, and
wherein said second barrier membrane holder is integrated into said second barrier membrane and has a groove to accept a second of said O-rings.

6. The multi-pulse rocket motor according to claim 5, wherein:
said first barrier membrane is an inner barrier membrane that is held by said first barrier membrane holder and covers the inner circumferential surface of said propellant of said second pulse unit;
said second barrier membrane is an aft barrier membrane that is held by said second barrier membrane holder and covers a rear surface of said propellant of said second pulse unit; and
respective ends of said aft barrier membrane and said inner barrier membrane are bonded to each other over an entire periphery thereof.

7. The multi-pulse rocket motor according to claim 5, further comprising an additional propellant filled from said forward joint of said second pulse unit to said rearward joint of said second pulse unit to cover said barrier membrane.

* * * * *